(12) United States Patent
Jerantowski

(10) Patent No.: US 7,107,878 B1
(45) Date of Patent: Sep. 19, 2006

(54) TOOL WITH INTEGRAL FLUID RESERVOIR FOR HANDLING OIL AND FUEL FILTERS

(76) Inventor: Stanley Jerantowski, 2323 Del Prado Blvd., Cape Coral, FL (US) 33990

( * ) Notice: Subject to any disclaimer, the term of this patent is extended or adjusted under 35 U.S.C. 154(b) by 14 days.

(21) Appl. No.: 10/927,559

(22) Filed: Aug. 26, 2004

Related U.S. Application Data

(60) Provisional application No. 60/498,330, filed on Aug. 26, 2003.

(51) Int. Cl.
B24B 13/06 (2006.01)

(52) U.S. Cl. .................... 81/121.1; 81/120; 81/125; 81/3.4

(58) Field of Classification Search ............... 81/121.1, 81/120, 125, 64, 3.4, 3.6, 441, 53.2, 3.8, 81/3.29; 7/100
See application file for complete search history.

(56) References Cited

U.S. PATENT DOCUMENTS

| | | | | |
|---|---|---|---|---|
| 3,385,141 A | * | 5/1968 | Norman | 81/120 |
| 3,853,026 A | * | 12/1974 | Rhodes | 81/90.2 |
| 4,266,452 A | * | 5/1981 | Crist | 81/124.7 |
| 4,865,727 A | * | 9/1989 | Krauss | 210/168 |
| 5,065,648 A | * | 11/1991 | Hocfbaum, Jr. | 81/64 |
| 5,271,299 A | * | 12/1993 | Wadsworth | 81/121.1 |
| 5,924,342 A | * | 7/1999 | Chou | 81/120 |

* cited by examiner

Primary Examiner—Hadi Shakeri
(74) Attorney, Agent, or Firm—William E. Noonan

(57) ABSTRACT

A tool for oil and fuel filters includes a generally cylindrical body having an open upper and a closed lower end. The body includes an interior chamber having a plurality of tapered radial projections that extend longitudinally within the interior chamber. The projections include respective tapered gripping surfaces that engage filters having respective diameters at corresponding depths within the chamber. The chamber defines a reservoir for collecting fluid that leaks when the filter is removed.

3 Claims, 4 Drawing Sheets

TOOL WITH INTEGRAL FLUID RESERVOIR FOR HANDLING OIL AND FUEL FILTERS

RELATED APPLICATION

This application claims the benefit of U.S. Provisional Patent Application Ser. No. 60/498,330 filed Aug. 26, 2003.

FIELD OF THE INVENTION

This invention relates to a tool designed for removing and installing oil and fuel filters of the type used in land vehicles and marine vessels. More particularly, this invention relates to a filter handling tool having an integral reservoir for collecting fluid (e.g. oil, gasoline or diesel fuel) that drains when the filter is removed.

BACKGROUND OF THE INVENTION

Virtually all motorized land vehicles and marine vessels employ fuel and oil filters. Periodically, these components require removal and replacement. Removing a hot oil filter can be an especially messy and hazardous task. As the filter is removed, engine oil tends to leak onto and coat the exterior of the filter. This makes the filter extremely messy and slippery to handle. A person using his or her bare hands may find it difficult to quickly and firmly remove or reattach the filter. The outer wall of the filter also tends to be extremely hot and can cause a serious burn if it is handled directly.

In addition to the foregoing problems, a previously installed filter is often secured tightly to the engine block and, as a result, is quite difficult to remove without the assistance of a wrench. Various filter wrenches are currently available. Although these devices provide improved torque and facilitate removal of the filter, they typically do not address the problems associated with oil that drips or leaks from the engine when the filter is removed. Oil in an engine is usually under some pressure and leakage is almost invariably exhibited any time the filter is removed, even if most of the oil has already been discharged through a drain. Not only does the oil that leaks from the oil filter receptacle coat the outer wall of the filter, some of the oil is apt to be spilled into the environment (e.g. soil, body of water, etc.). This obviously pollutes the environment and is extremely undesirable. A device is needed which catches the fluid that is normally discharged from an engine into the environment when the filter is removed from the engine.

SUMMARY OF THE INVENTION

It is therefore an object of the present invention to provide a tool that enables virtually all types of oil and fuel filters to be quickly, firmly and effectively removed and installed.

It is a further object of this invention to provide a tool that catches and collects oil or fuel discharged from the engine of a land vehicle or marine vessel when the filter is removed.

It is a further object of this invention to provide a tool with an integral fluid reservoir that enables the user to quickly and effectively remove and replace a filter without having to directly touch a messy, slippery and hot outer wall of the filter.

It is a further object of this invention to provide a tool that allows fuel and oil filters to be changed much more quickly, securely and cleanly than has heretofore been possible.

It is a further object of this invention to provide a tool that allows the user to remove and install an oil or fuel filter without a serious risk of burning his or her hands.

It is a further object of this invention to provide a tool with an integral reservoir for trapping fluids that drain from a vehicle using the filter so that environmental pollution is reduced.

It is a further object of this invention to provide a tool that is able to effectively grip, turn and hold virtually all sizes of fuel and oil filters and which provides a reservoir for all such filters so that leaking or dripping fuel or oil is effectively collected.

This invention results from a realization that standard filter wrenches may be improved upon significantly by a filter handling tool utilizing an integral fluid reservoir that traps and collects oil, gasoline and other fluids that drain from an engine when the filter is removed by the tool. This invention results from the further realization that such a tool may be constructed efficiently to fit virtually all sizes of filters by employing a unique tapered filter gripping structure within the tool.

This invention features a tool for use in combination with a fuel or oil filter of the type employed in a motorized land vehicle or marine vessel. The tool includes a generally cylindrical body having an open upper end and a closed lower end. The body includes an interior chamber that carries a plurality of tapered radial projections or fingers, which are carried by and spaced apart on an inner wall of the body. Each finger extends longitudinally within the chamber and includes a relatively thin end section that is positioned proximate the open end of the body and a relatively thick end section that is positioned proximate the closed end of the body. Each finger is tapered radially inwardly from the thin end section to the thick end section. The fingers provide for exterior gripping engagement of a filter that is inserted into the chamber of the body through the open end. The fingers provide for a relatively wide diameter interior space proximate the open end of the body and a relatively narrow diameter interior space proximate the closed end of the body. This enables various sizes of fuel and oil filters to be inserted into the interior chamber of the body such that the exterior surface of a filter having a particular diameter is engaged and gripped by the fingers at a corresponding position thereon, which position corresponds with a respective depth in the chamber. The space defined by the inner wall of the chamber is larger than the interior space defined by the radial fingers such that a liquid accommodating reservoir is formed within the chamber. At least a part of that reservoir comprises an annular space between the inner wall of the chamber and the gripping surfaces of the radial fingers. The foregoing structure allows a filter to be inserted into the chamber and gripped firmly by the fingers. Fuel or oil that leaks from the engine collects in the reservoir section of the chamber so that messy and polluting fluid leaks are avoided.

In a preferred embodiment, the inner wall of the body has a cylindrical or annular cross sectional shape. The closed end of the filter body may comprise a flat base. The exterior surface of the generally cylindrical body may include a ribbed gripping portion that is formed annularly about the exterior cylindrical surface of the body. Each of the radial fingers may include a sloped or tapered ramp portion that widens radially between the open end and the closed end of the filter body. A longitudinal rib may be formed on an inner surface of at least one of the fingers.

The filter handling tool may be constructed in various sizes so that virtually all sizes and shapes of oil filters may be manipulated using the tool.

DETAILED DESCRIPTION OF PREFERRED EMBODIMENTS

Other objects, features and advantages will occur from the following description of a preferred embodiment and the accompanying drawings, in which.

Figure 2:
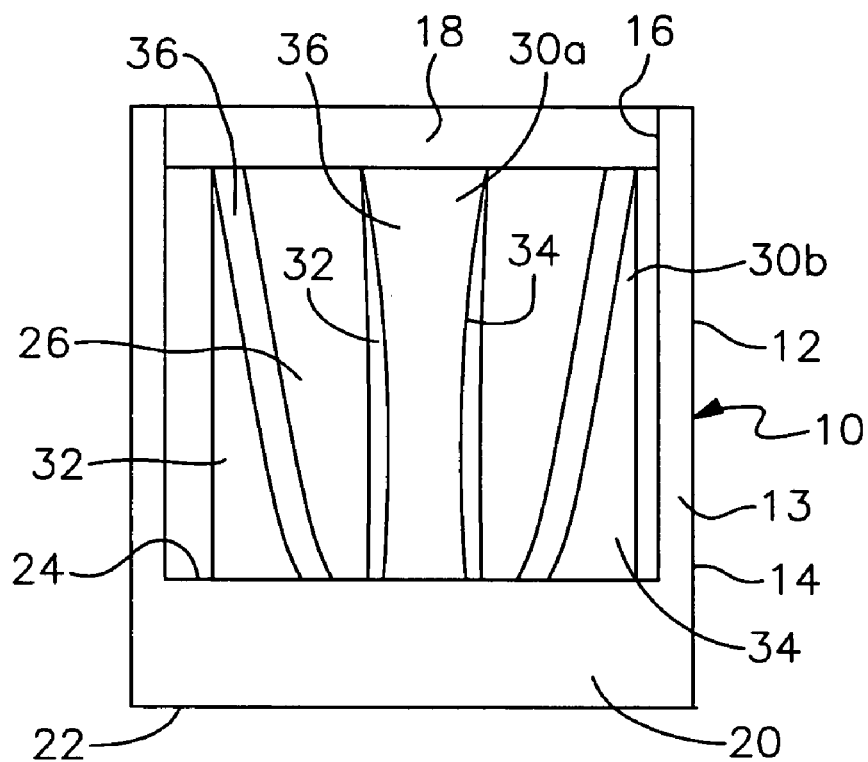
FIG. 2 is a cross sectional view taken along line 2—2 of FIG. 1.
Figure 3:
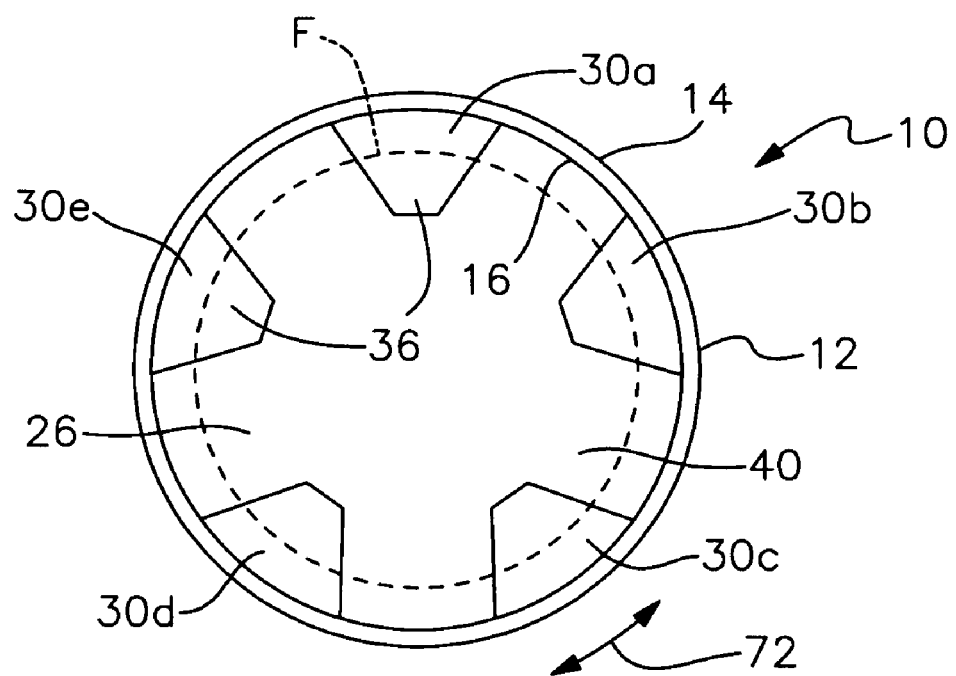
Figure 4:
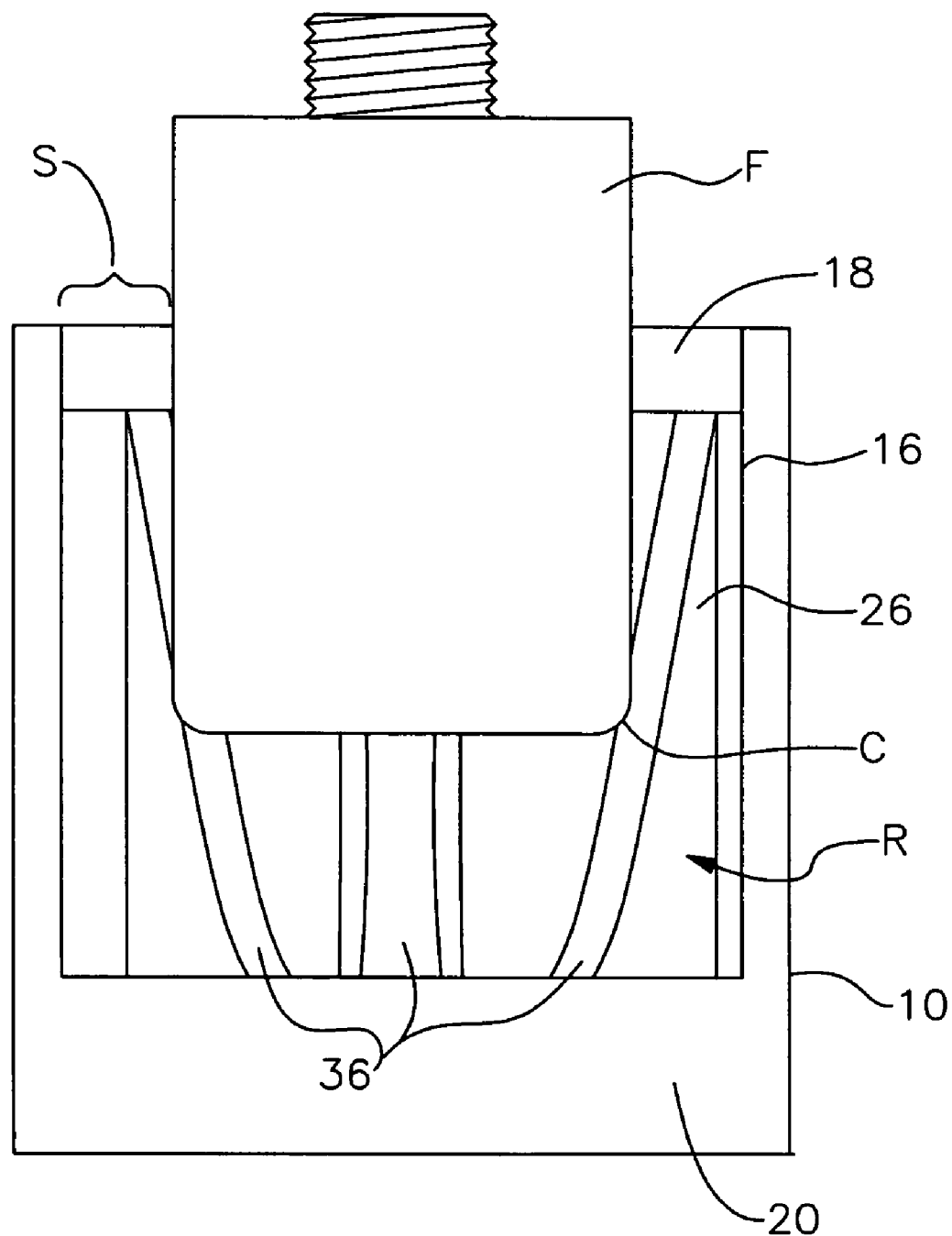
Figure 5:
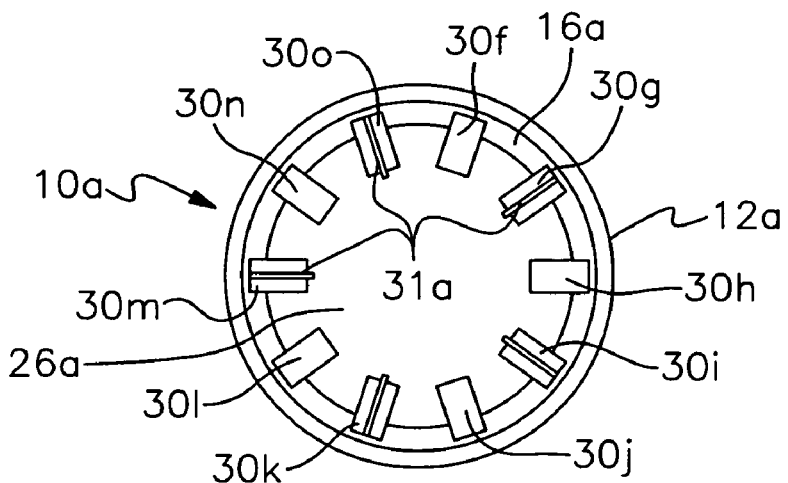
Figure 6:
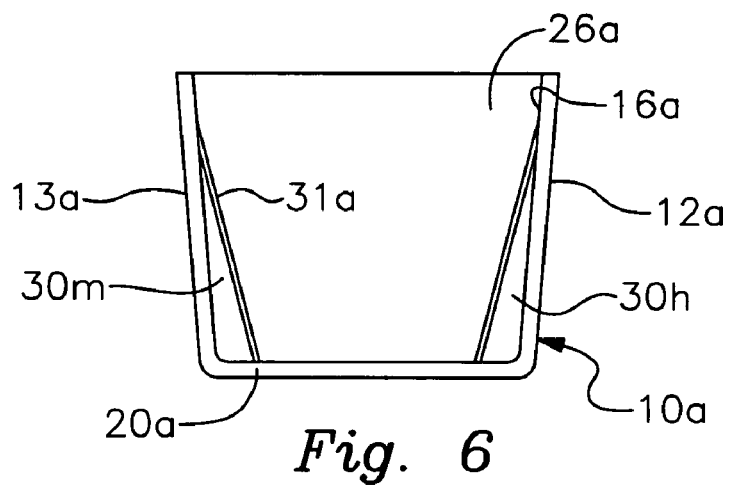
Figure 7:
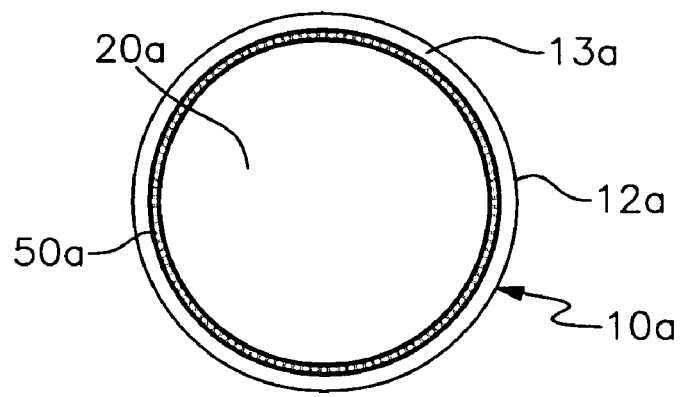

FIG. 3 is a top plan view of the filter tool with a fuel or oil filter shown in phantom within the interior chamber of the wrench and engaged by the radially inward fingers; and FIG. 4 is an elevational, cross sectional view similar to FIG. 2 with a filter positioned within the tool and engaged by the gripping projections of the wrench; and FIGS. 5, 6 and 7 are top, cross sectional side and bottom views respectively of an alternative preferred tool according to this invention.

Figure 1:
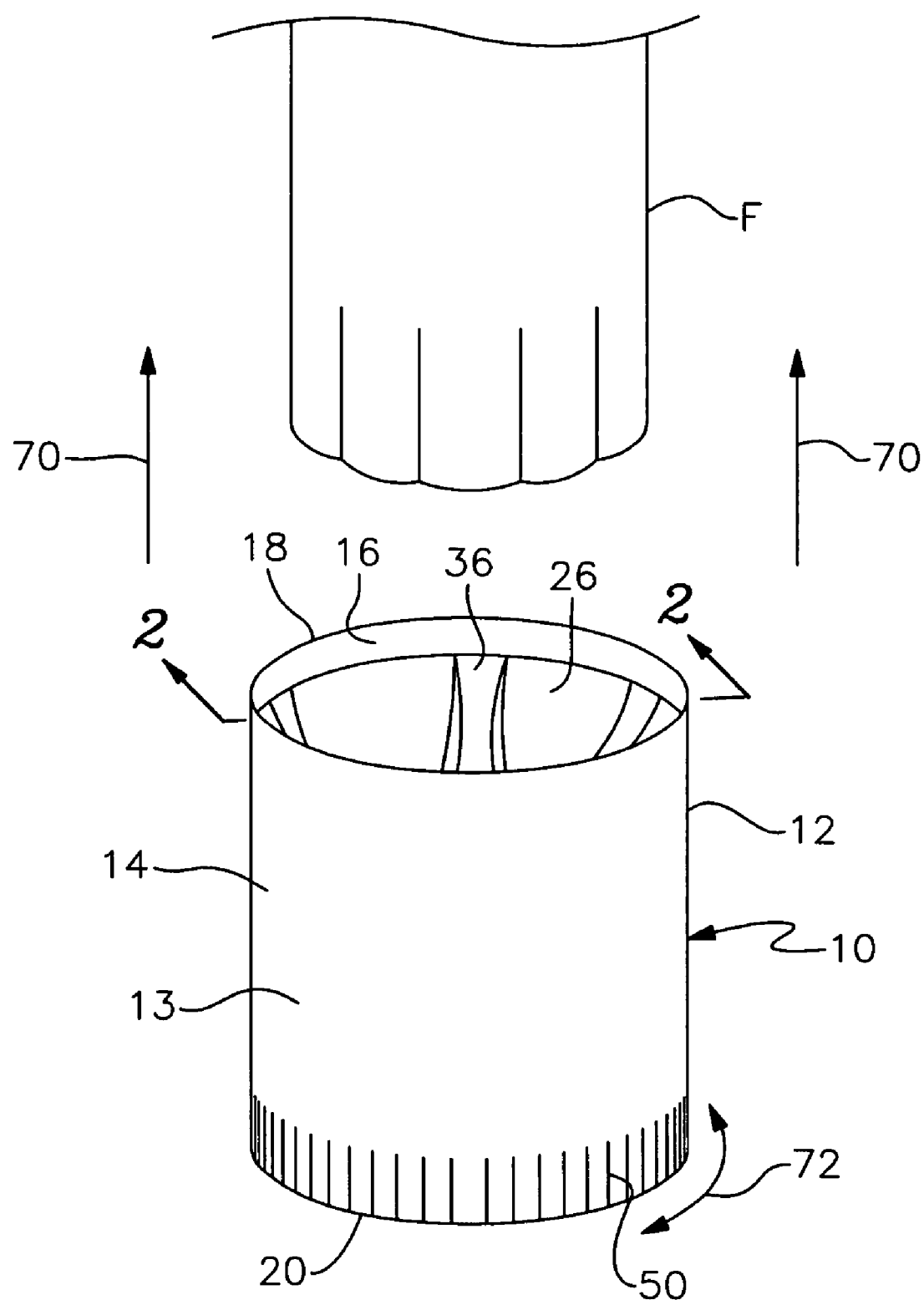
FIG. 1 is a perspective view of a preferred version of the filter tool of this invention positioned next to an oil or fuel filter of a land vehicle or marine vessel.

There is shown in FIG. 1 a filter handling tool 10 that is designed to be used in connection with various oil and fuel filters F in accordance with this invention. Typically the filter is of the type employed in any one of various land vehicles (e.g. automobiles, trucks, etc.) or marine vessels (e.g. boats having outboard or inboard engines). The tool is effective for use with virtually all types of fuel and oil filters. The particular type of vehicle, vessel or filter does not constitute a limitation of this invention.

Tool 10 preferably comprises a one-piece, molded plastic construction. A soft PVC or other rugged material exhibiting some resilience and flexibility (e.g. a durable elastomer or rubberized plastic) is particularly preferred. Various types of heat insulated metals and metal alloys may also be utilized. Tool 10 features a generally cylindrical, cup-shaped body 12 comprising a side wall 13 having an outer wall surface 14 and an inner wall surface 16. In the embodiment shown in FIGS. 1–4, body 12 has a cylindrical configuration. However, it should be understood that outer wall surface 14 (and by the same token inner wall surface 16) may have shapes that are not perfectly cylindrical. For example, a polygonal or other noncircular cross sectional configuration may be utilized. As used herein, "generally cylindrical" should be understood to comprise all such shapes. The side wall may also have a truncated conical or tapered shape.

Body 12 includes an open upper end 18 and a closed lower end 20, which comprises a flat base unitarily connected with cylindrical side wall 13. Preferably, at the very least, the bottom surface 22 of base 20 is flat so that tool 10 can sit securely in an upright condition as shown in FIGS. 1 and 2, without tipping, when the tool is not in use. Base 20 also includes a flat inner surface 24, although in certain versions the interior lower surface 24 may not be perfectly flat.

Cylindrical wall 13 and base 20 define an interior cavity or chamber 26 that is exposed through open upper end 18 of tool 10. The diameter of open upper end 18 may vary within the scope of this invention. Generally speaking, that diameter should be large enough to accommodate virtually all filters found on land vehicles and marine vessels. Alternatively, tool 10 may have assorted interior chamber diameters such that different sizes of tools may be utilized for different sizes of vehicle and vessel filters.

A plurality of radially inwardly pointing projections or fingers 30a, 30b, 30c, 30d and 30e are formed on interior wall surface 16 of cylindrical side wall 13. More particularly, each finger comprises an elongate, tapered ramp that is formed unitarily along the interior surface 16 of side wall 13. Each finger extends longitudinally along the interior surface of the side wall and is parallel to the axis of the cylindrical body 12. Fingers 30a–30e are spaced apart at generally equivalent angles about the interior wall surface 16. Each finger tapers inwardly from a thin end section positioned proximate open end upper 18 to a relatively thick end section positioned proximate base 20. Each of the fingers 30a–30e includes a pair of opposing sides 32 and 34 that project inwardly from surface 16 and an inwardly facing and tapered gripping surface 36 formed between the sides. The gripping surfaces 36 define an interior space 40 within chamber 26, which interior space accommodates a fuel or oil filter in the manner described more fully below. The diameter of interior space 40 progressively decreases from the open upper end 18 to the closed lower end 20 of tool 10. Preferably, each finger exhibits an identical or at least very similar slope and taper. In alternative embodiments, the radially inward projections may have alternative shapes and sizes. Additionally, although five such projections are depicted herein, other numbers of projections may be utilized within the scope of this invention. Fingers 30a–30e employ a continuous gripping surface 36 with a uniform slope of taper. In alternative versions, the gripping surface may be discontinuous (i.e. one or more of the fingers may comprise a discontinuous series of finger segments aligned longitudinally on the inner surface of the side wall). Non-uniform tapers may also be utilized.

The exterior surface 14 of side wall 13 includes an annular series of longitudinal ribs 50 formed proximate closed bottom end 20. These ribs are provided to facilitate the turning of tool 10 when it is engaged with filter F. The outer gripping surface of tool 10 may have various alternative types of gripping components and handles in accordance with this invention.

The use of tapered fingers 30a–30e accomplishes a number of benefits. In particular, the fingers grip a fuel or oil filter when the tool is engaged with that filter so that the chamber 26 of the tool defines a reservoir around space 40 for catching and collecting oil that leaks from the vehicle, vessel or filter, as the filter is being removed. The fingers also allow and almost endless variety of shapes and sizes of filters to be effectively and securely engaged by the tool.

Operation of tool 10 in combination with filter F is depicted in the drawings and most specifically in FIGS. 1, 3 and 4. Tool 10 is engaged with a filter F by orienting the tool as shown in FIG. 1 and inserting the tool onto the filter such that filter F is inserted into chamber 26 through open upper end 18 of tool 10. See tool 10 being engaged with filter F in the direction of arrows 70. Depending upon the diameter of filter F, the bottom corner of the filter (see corner C in FIG. 4) engages the inwardly facing gripping surfaces 36 of fingers 30a–30e at a corresponding depth within chamber 26. As previously described, the interior space 40 defined by gripping surfaces 36 of fingers 30a–30e, varies from top to bottom within chamber 26. The interior space is widest proximate the open upper end 18 and is narrowest proximate the closed lower end 20. As a result, relatively wide diameter filters F engage the gripping surfaces 36 proximate the upper end of the chamber, whereas narrower filters tend to engage the gripping surfaces at respectively lower positions within the chamber. The narrower the filter diameter, the deeper it is inserted into the chamber until it engages the gripping surfaces of the radially inward fingers. The molded plastic construction of the fingers typically exhibits a degree of resilience that enables those fingers to seat against and firmly and securely grip the filter. This grip is typically snug enough to enable the tool to turn the filter as the tool is rotated in either of the clockwise and counterclockwise directions indicated by double-headed arrow 72 in FIG. 1. Tool 10 thereby provides improved torque so that filter is removed or installed, as required, much more easily than if such operation is performed by hand.

When tool 10 is engaged with an installed filter F, as shown in FIGS. 1, 3 and 4, the tool may be utilized to facilitate removal of the filter by turning the tool in a counterclockwise direction. This loosens the filter from the engine. It should be noted that in cases where the filter is especially tightly attached (such as where the filter has not been replaced for an extended duration), a conventional filter wrench can be engaged with tool 10 and turned after tool 10 is engaged with the filter. The standard wrench can be used in this manner to loosen a stuck filter and facilitate subsequent hand turning of tool 10. Eventually, as filter F is removed, oil tends to leak from the engine and the filter F itself. This oil leaks over the sides of filter F and into chamber 26. The space formed between the engaged filter F, and the interior surface 16 and base 20 of body 12 defines a reservoir R that catches and collects the leaking fluid. Typically, there is always at least some space S formed between the side wall of filter F and inner wall 16 of tool 10. This space receives the leaking oil (or gasoline when a fuel filter is involved) such that the fluid is collected in the reservoir R formed within chamber 16. This fluid is thereby prevented from spilling into and polluting the water, soil or other surrounding environment. Fluid is trapped regardless of the size of filter F or the corresponding depth to which the filter extends within chamber 26.

To install a replacement filter, that item is engaged with tool 10 such that fingers 30*a*–30*e* engage the periphery of the replacement filter. The user then aligns the filter with the filter receptacle in the engine and turns tool 10 clockwise until the replacement filter is securely installed in the engine. The tool provides the torque that is needed to securely seat the filter in the engine.

Accordingly, tool 10 provides a number of significant benefits. Not only is leaking or dripping oil and gasoline caught and collected, the wrench facilitates and reduces the mess and inconvenience commonly associated with filter changes. The user does not have to touch the outer wall of the filter. As a result, his or her hands remain much cleaner and the risk of serious burns caused by the hot filter is reduced. Turning the filter is much easier; not only is torque increased, the user is able to obtain a much better (firmer) grip on the filter and his or her hands do not slip on the oil or fuel smeared filter housing.

An alternative preferred filter handling tool 10*a* is disclosed in FIGS. 5–7. Tool 10*a* preferably comprises a one-piece, molded plastic construction that utilizes the materials previously described. The tool has a cup-shaped body 12*a* featuring a generally cylindrical side wall 13*a* that is tapered slightly from its top end to its bottom end, as best depicted in FIG. 6. A flat base 20*a* in unitarily attached to side wall 13*a* at the lower end of body 12*a*. The upper end of body 12*a* is open as in the previously described embodiment.

Body 12*a* includes an interior chamber 26*a* that may include various sizes for accommodating different sizes of oil or fuel filters. A plurality of radial gripping fingers 30*f*–30*o* are formed unitarily on interior wall surface 16*a* of side wall 13*a*. Once again, each finger comprises an elongate, tapered ramp that extends longitudinally along inner surface 16*a*. Each finger includes a relatively thin or narrow upper end section positioned proximate the open upper end of body 12*a* and a relatively thick lower end section adjacent base 20*a*. In this version, ten tapered gripping fingers are utilized and the fingers are spaced at regular intervals or equal angles about the interior circumference of side wall 13*a*. Fingers 30*f*, 30*h*, 30*j*, 30*l* and 30*n* feature a construction similar to that employed by the fingers in the previous embodiment. Each of the remaining fingers 30*g*, 30*i*, 30*k*, 30*m* and 30*o* carries an elongate engagement rib 31*a* that extends longitudinally along an inwardly facing surface of the gripping finger. As best shown in FIG. 5, the ribbed and unribbed gripping fingers are arranged in an alternating fashion about the interior circumference of the filter handling tool. Gripping ribs 31*a* improve the frictional interengagement between the fingers and the filter engaged by the tool. This facilitates removal of the filter when the tool is engaged by the tool and rotated by the user. As in the previously described embodiment, other numbers of fingers or projections may be formed along the inner surface of side wall 13*a*.

Once again, an annular series of longitudinal ribs 50*a* may be formed proximate base 20*a*. These ribs again facilitate gripping and turning of tool 10*a* when it is engaged with the fuel or oil filter.

Tool 10*a* is engaged with a filter in a manner analogous to that previously described. The tool is engaged with the filter by inserting the filter through the open upper end of the tool. The exterior surface of the filter engages the gripping fingers at a depth that corresponds to the diameter of the filter. Wider filters engage the fingers closer to the open end of tool 10*a* whereas narrow filters engage the fingers closer to the closed lower end or base 20*a*. The narrower the filter diameter, the deeper the filter is inserted into chamber 26*a*. The filter is pushed against the gripping fingers and the molded plastic construction of those fingers has sufficient flexibility and resilience to enable the fingers to seat against and securely grip the filter. Snug interengagement is achieved between the gripping fingers and the received filter. Tool 10*a* is then rotated and improved torque is achieved so that the filter is removed and installed quickly, conveniently and relatively effortlessly. Once again, a conventional wrench may be used to loosen the filter before it is completely removed by tool 10*a*.

When the filter is seated against gripping fingers 30*f*–30*o*, a reservoir or space is formed in the chamber between the bottom and sides of the filter and the interior surface of body 12*a*. This reservoir captures and holds oil, gasoline or diesel fuel that leaks or spills from the engine during removal or replacement of the filter. As a result, the benefits and advantages achieved by the previously described embodiment are likewise accomplished by the version of the tool depicted in FIGS. 5–7.

From the foregoing it may be seen that the apparatus of this invention provides for an improved oil and fuel filter handling tool, which uniquely features both a fluid trapping reservoir and a variably sized interior gripping surface that enables the wrench to be used with all sizes and configurations of filters. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A tool for handling a fuel or oil filter, said tool comprising:
    a cup-shaped body having an interior chamber for receiving the filter; and
    a plurality of resilient, tapered fingers attached unitarily to and projecting radially inwardly from a side wall of said body, said side wall having a generally cylindrical shape for surrounding said filter, each finger including a pair of opposing sides that project inwardly from said side wall and an inwardly facing and radially tapered gripping surface formed between said sides and facing the cylindrical axis of said side wall, each finger extending longitudinally within said chamber in a radially tapered manner from a relatively thin end section positioned proximate an open upper end of said body to a relatively thick end section positioned proximate a closed lower end of said body, at least one of said fingers including an elongate engagement rib that is carried on a radially inwardly pointing surface of said finger, said body and said fingers having a one-piece molded plastic construction and said fingers having a resilient composition for resiliently and snugly gripping a filter inserted into said chamber of said body through said open end.

2. The tool of claim 1 in which said gripping surfaces of said fingers define an interior space within said chamber, which interior space is for accommodating a filter engaging said gripping surfaces of said fingers, said inner surface of said side wall and said base defining a reservoir for holding fluid discharged from the filter.

3. The tool of claim 1 in which said side wall includes a series of longitudinal ribs arranged circumferentially on an exterior surface of said side wall for being engaged by a user to facilitate axial rotation of said body.

* * * * *